(12) United States Patent
Watanabe (10) Patent No.: US 10,416,913 B2
(45) Date of Patent: Sep. 17, 2019

(54) INFORMATION PROCESSING DEVICE THAT MONITORS OPERATION OF STORAGE UTILIZING SPECIFIC DEVICE BEING CONNECTED TO STORAGE

(71) Applicant: FUJITSU LIMITED, Kawasaki-shi, Kanagawa (JP)

(72) Inventor: Ryosuke Watanabe, New York, NY (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/710,220

(22) Filed: Sep. 20, 2017

(65) Prior Publication Data

US 2018/0011654 A1  Jan. 11, 2018

Related U.S. Application Data

(63) Continuation of application No. PCT/JP2015/059399, filed on Mar. 26, 2015.

(51) Int. Cl.
*G06F 3/06* (2006.01)
(52) U.S. Cl.
CPC .......... *G06F 3/0634* (2013.01); *G06F 3/0605* (2013.01); *G06F 3/0653* (2013.01); *G06F 3/0689* (2013.01)

(58) Field of Classification Search
CPC .... G06F 3/0634; G06F 3/0689; G06F 3/0653; G06F 3/0605
USPC .................................................. 711/114, 154
See application file for complete search history.

(56) References Cited

U.S. PATENT DOCUMENTS

| 7,779,202 B2 | 8/2010 | Tanaka et al. |
| 2006/0236161 A1 | 10/2006 | Tanaka et al. |
| 2012/0005410 A1 | 1/2012 | Ikeuchi |
| 2013/0151841 A1 | 6/2013 | McGraw |
| 2013/0232301 A1* | 9/2013 | Lambert ............... G06F 3/0689 711/114 |
| 2014/0108693 A1 | 4/2014 | Minezaki et al. |
| 2014/0365727 A1 | 12/2014 | Kawano et al. |
| 2015/0074665 A1 | 3/2015 | Kamino et al. |

(Continued)

FOREIGN PATENT DOCUMENTS

| JP | 10-301719 | 11/1998 |
| JP | 2006-301714 | 11/2006 |

(Continued)

OTHER PUBLICATIONS

International Search Report dated May 19, 2015 in corresponding International Patent Application No. PCT/JP2015/059399.

(Continued)

*Primary Examiner* — Hong C Kim
(74) *Attorney, Agent, or Firm* — Staas & Halsey LLP (57) ABSTRACT

An information processing device including: a processor configured to collect information on a connected expansion device; and a controller configured to receive the information on the expansion device from the processor, to determine, with respect to a type of an expansion device, whether the expansion device is a specific device that is connected to a storage, and to perform, when the expansion device has been determined to be the specific device, monitoring processing of monitoring an operation of the storage based on information on the storage that is obtained from the specific device.

5 Claims, 5 Drawing Sheets

(56) References Cited

U.S. PATENT DOCUMENTS

| | | | | |
|---|---|---|---|---|
| 2015/0169221 A1* | 6/2015 | Shirasu | ............... | G06F 3/0685 |
| | | | | 711/163 |
| 2015/0177998 A1* | 6/2015 | Chen | ................... | G06F 3/0619 |
| | | | | 714/42 |
| 2015/0178175 A1* | 6/2015 | Fujimori | ............ | G06F 11/0757 |
| | | | | 713/2 |
| 2016/0055007 A1* | 2/2016 | Toriyama | ........... | G06F 9/44505 |
| | | | | 713/2 |
| 2017/0031857 A1* | 2/2017 | Qiu | ........................ | G06F 3/061 |
| 2017/0235519 A1* | 8/2017 | Qiu | ...................... | G06F 3/0613 |
| | | | | 710/313 |

FOREIGN PATENT DOCUMENTS

| | | |
|---|---|---|
| JP | 2010-191762 | 9/2010 |
| JP | 2012-14415 | 1/2012 |
| JP | 2013-539887 | 10/2013 |
| JP | 2014-238771 | 12/2014 |
| WO | 2012/050590 A1 | 4/2012 |
| WO | 2012/172666 A1 | 12/2012 |
| WO | 2013/175570 A1 | 11/2013 |

OTHER PUBLICATIONS

Written Opinion of the International Searching Authority dated May 19, 2015 in corresponding International Patent Application No. PCT/JP2015/059399.

\* cited by examiner

INFORMATION PROCESSING DEVICE THAT MONITORS OPERATION OF STORAGE UTILIZING SPECIFIC DEVICE BEING CONNECTED TO STORAGE

CROSS-REFERENCE TO RELATED APPLICATION

This application is a continuation application of International Application PCT/JP2015/059399 filed on Mar. 26, 2015 and designated the U.S., the entire contents of which are incorporated herein by reference.

FIELD

The embodiments discussed herein are related to an information processing device.

BACKGROUND

In a recent server system, a hard disk drive (HDD) is generally redundant with redundant arrays of inexpensive disks (RAID), which makes it possible to replace a HDD while maintaining data without stopping the system. Thus, there have been increasing demands of users who use a redundant HDD to make a preventive replacement of a HDD before there actually occurs a failure or a performance degradation.

When there occurs a failure in a HDD, a media error in which data is not successfully read occurs due to a failure in a magnetic head. In general, when there only occurs a media error in a HDD, data can be read and written by performing a retrial, so the HDD is not in a failure state, and a light emitting diode (LED) that reports an error in the HDD does not light up.

However, if the media error occurs frequently, a retrial of an access to a HDD will be performed many times, which results in degrading a performance in the access to a HDD. Users who use a redundant HDD with RAID want to make a replacement of a HDD before the media error occurs frequently to cause the performance degradation.

Conventionally, in order to avoid a performance degradation due to the frequent occurrence of this media error, software that checks a media error of a HDD at specified time intervals, and brings the HDD offline so as to remove the HDD is operated on an Operating System (OS).

Further, a method is known that checks a media error using a RAID controller (see, for example, Patent Document 1).

There exist many types or versions of OSes used in an existing server system. When software that checks a media error is not operated on a specific OS, a media error of a HDD will not be checked if the specific OS is used. Thus, there is a need to cause the software that checks a media error of a HDD to operate for each OS or version, which results in high costs.

Further, in the method described in Patent Document 1, a specific RAID card that has a function of checking a media error is used.

Patent Document 1: Japanese Laid-open Patent Publication No. 2006-301714
Patent Document 2: Japanese Laid-open Patent Publication No. 2010-191762

SUMMARY

According to an aspect of the invention, an information processing device includes a processor and a controller. The processor collects information on a connected expansion device.

The controller receives the information on the expansion device from the processor, determines, with respect to a type of an expansion device, whether the expansion device is a specific device that is connected to a storage, and performs, when the expansion device has been determined to be the specific device, monitoring processing of monitoring an operation of the storage based on information on the storage that is obtained from the specific device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments will now be described with reference to the drawings.

Figure 1:
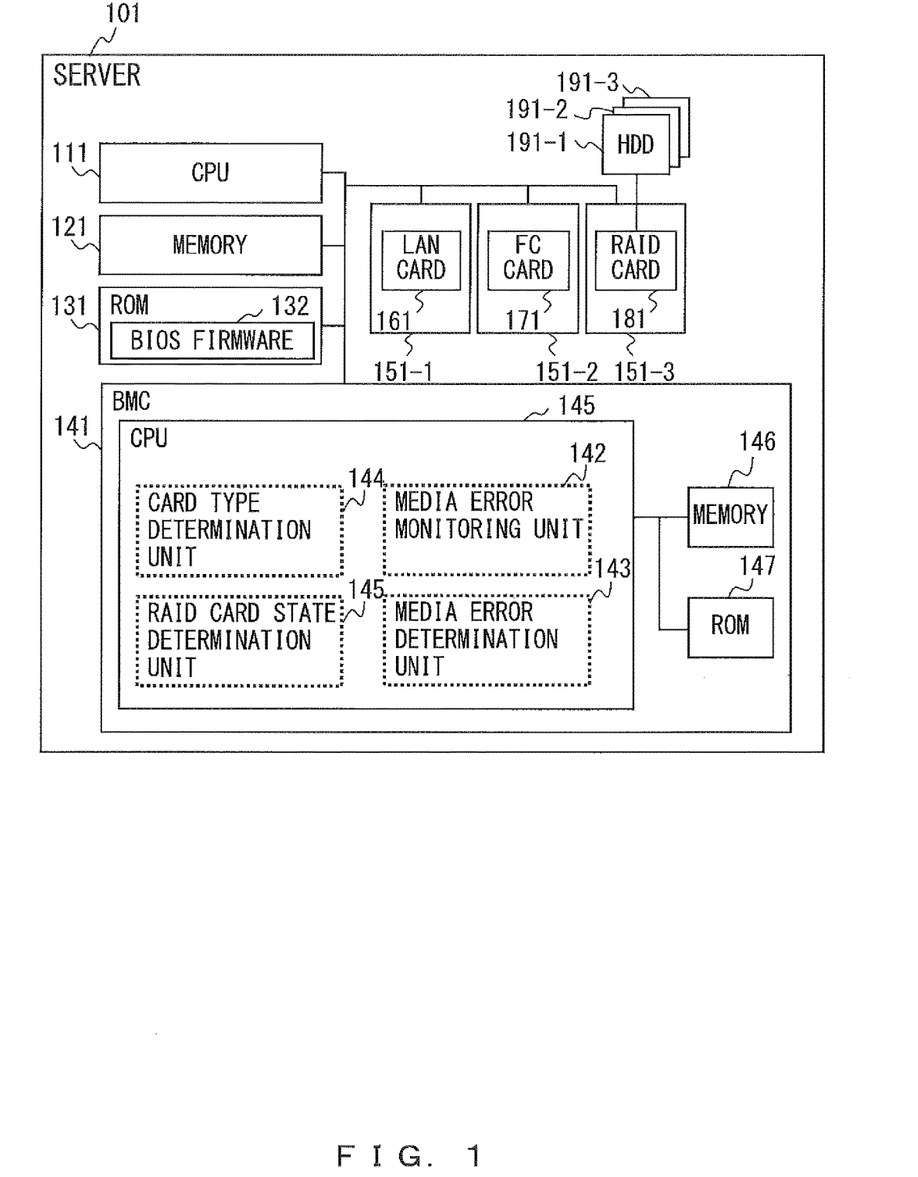
FIG. 1 illustrates a configuration of a server according to embodiments.

FIG. 1 illustrates a configuration of a server according to embodiments.

A server 101 includes a central processing unit (CPU) 111, a memory 121, a read only memory (ROM) 131, a baseboard management controller (BMC) 141, a PCI express (PCIe) slot 151-$i$ (i=1 to 3), a local area network (LAN) card 161, a fiber channel (FC) card 171, a redundant arrays of inexpensive disks (RAID) card 181, and a hard disk drive (HDD) 191-$j$ (j=1 to 3). The server 101 is an example of an information processing device.

The CPU 111 is a processor that performs a variety of information processing. The CPU reads BIOS firmware into the memory 121 and executes it. The CPU 111 further reads an OS (not illustrated) stored in an HDD 191-$j$ into the memory 121 and executes it. The CPU 111 is an example of a processor.

The memory 121 temporality stores a program or data used in the server 101. The memory 121 is, for example, a random access memory (RAM). The memory 121 is an example of a storing unit.

The ROM 131 is a storage that stores a program or data used in the server 101. The ROM 131 stores BIOS firmware 132. The BIOS firmware 132 is a program that, for example, collects information on a connected expansion card, initializes the connected expansion card, and activates an OS when the server 101 is started.

The BMC 141 is an integrated circuit that monitors operations of components of the server 101 such as the CPU 111, the memory 121, a fan (not illustrated), a power supply unit (PSC) (not illustrated), and the HDD 191-$j$. The BMC 141 is an example of a controller. The BMC 141 includes a CPU 145, a memory 146, and a ROM 147. The CPU 145 monitors the operations of the components of the server 101 by executing BMC firmware stored in the ROM 147 by use of the memory 146. The CPU 145 operates as a media error monitoring unit 142, a media error determination unit 143, a card type determination unit 144, and a RAID card state determination unit 145 by executing the BMC firmware. Using an inter-integrated circuit (I2C), the BMC 141 communicates with an expansion card that is compatible with the I2C and that is arranged in the PCIe slot 151-i. The BMC 141 is compatible with an intelligent platform management interface (IPMI), has a keyboard controller style (KCS) interface, and communicates with the CPU 111 and the IPMI.

The PCIe slot 151-i is an insertion opening for arranging a PCIe card (an expansion card). The LAN card 161 is arranged in a PCIe slot 151-1, the FC card 171 is arranged in a PCIe slot 151-2, and the RAID card 181 is arranged in a PCIe slot 151-3.

The LAN card 161 is an expansion card having a communication interface that is connected to a communication network such as a LAN and that makes a data conversion associated with communication.

The FC card 171 is an expansion card having an interface whose connection is established by fiber channel.

The RAID card 181 is an expansion card that performs a RAID control such as a parity operation or a management of a storage. The HDD 191-j is connected to the RAID card 181 through a serial attached SCSI (SAS). The RAID card 181 is compatible with an I2C, and can communicate with the BMC 141 through the I2C.

Extension cards such as the LAN card 161, the FC card 171, and the RAID card 181 are examples of an expansion device that expands the functionality of the server 101.

The HDD 191-j is a storage that stores a program such as an OS (not illustrated) or data that is used in the server 101. The HDD 191-j is an example of a storage, and it may be a nonvolatile semiconductor storage such as a solid state drive (SSD). The number of HDDs 191-j used in the embodiments is an example, and any number of HDDs 191-j may be used. Further, each HDD 191-j has its identification number (a device number) that identifies the HDD 191-j.

Figure 2:
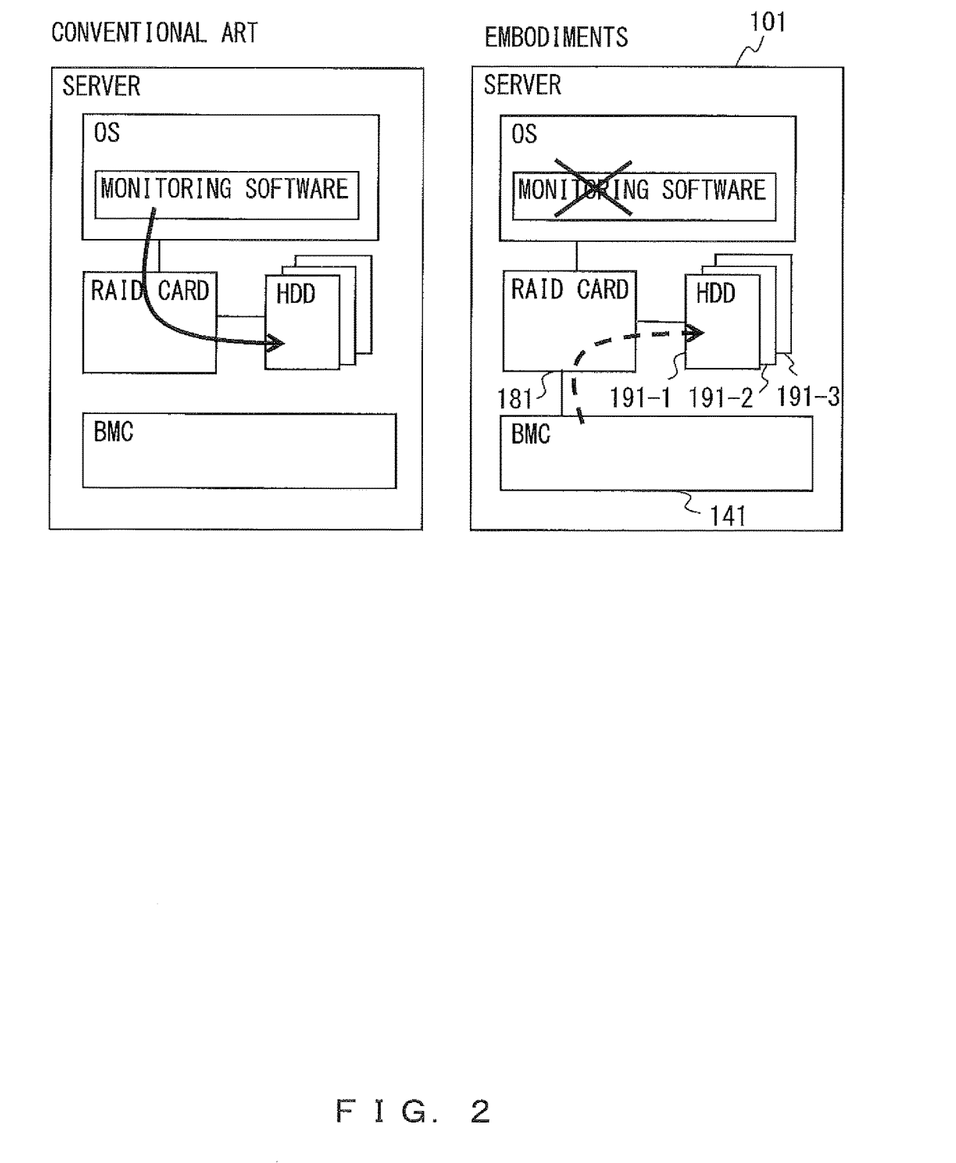
FIG. 2 illustrates conventional media-error-check processing and media-error-check processing of the embodiments.

FIG. 2 illustrates conventional media-error-check processing and media-error-check processing of the embodiments.

The conventional media-error-check processing is illustrated on the left side of FIG. 2, and the media-error-check processing of the embodiments is illustrated on the right side of FIG. 2.

A media error check is conventionally performed by monitoring software that is executed on an OS. The monitoring software checks an operation of a HDD.

In the embodiments, the media error check is performed by the BMC 141. The BMC 141 checks an operation of the HDD 191-j through the RAID card 181 connected to the BMC 141 through an I2C.

According to the information processing device of the embodiments, it is possible to monitor an HDD independently of the type of an OS by a BMC performing a media error check.

Figure 3:
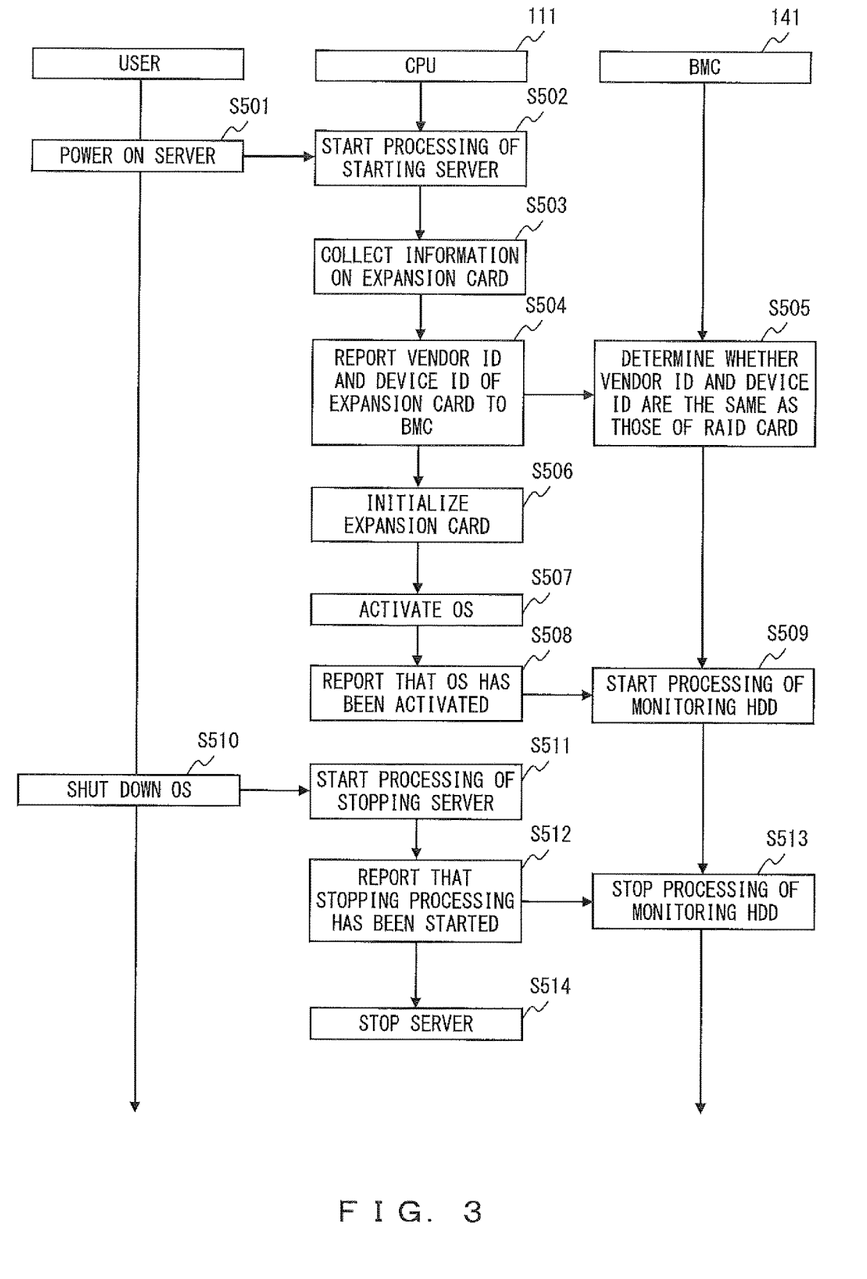
FIG. 3 is a diagram of a sequence from a start to a stop of a server according to the embodiments.

FIG. 3 is a diagram of a sequence from a start to a stop of the server according to the embodiments.

In Step S501, a user powers on the server 101.

In Step S502, the CPU 111 starts processing of starting the server 101. Specifically, the CPU 111 executes the BIOS firmware 132 using the memory 121.

In Step S503, the CPU 111 obtains information on an expansion card provided in the server 101. Specifically, the CPU 111 reads information (a vender ID and a device ID) on each expansion card (the LAN card 161, the FC card 171, and the RAID card 181) from a register on the expansion card, so as to obtain the information on the expansion card. The vendor ID indicates a manufacturer of an expansion card, and the device ID indicates which of the products manufactured by the manufacturer the expansion card is. The vendor ID and the device ID are examples of type information.

In Step S504, the CPU 111 transmits the information on the expansion card (the vender ID and the device ID) to the BMC 141 using an IPMI.

In Step S505, the card type determination unit 144 receives the information on the expansion card (the vender ID and the device ID) and determines whether the expansion card is a RAID card based on the information on the expansion card. Specifically, the card type determination unit 144 determines whether the expansion card is a RAID card according to whether a set of the received vendor ID and the received device ID is included in a list of a RAID card. The list of a RAID card is stored in, for example, the BMC 141 or the ROM 131, and a set of a vendor ID and a device ID of a RAID card is listed in the list. The BMC 141 knows, by the process of Step 3505 being performed, whether the server 101 is provided with the RAID card.

In Step 3506, the CPU 111 initializes the expansion card (the LAN card 161, the FC card 171, or the RAID card 181).

In Step S507, the CPU 111 activates an OS.

In Step S508, when the OS has been activated, the CPU 111 reports to the BMC 141 that the OS has been activated, using the IPMI.

In Step S509, the RAID card state determination unit 145 receives the report that the OS has been activated, and the media error monitoring unit 142 and the media error determination unit 143 start processing of monitoring the HDD 191-j. The monitoring processing will be described in detail later. The BMC 141 will not be allowed to monitor the RAID card 181 unless the RAID card 181 is initialized. As described above, the expansion card was initialized before the OS is activated. Thus, the BMC 141 knows, by receiving the report that the OS has been activated, that the RAID card 181 has been initialized and it is possible to monitor the RAID card 181.

The monitoring processing is performed when it has been determined in Step S505 that at least one of the expansion cards is a RAID card, and the monitoring processing is not performed when all of the expansion cards are not a RAID card.

In Step S510, the user shuts down the OS.

In Step S511, the CPU 111 starts processing of stopping the server 101, and powers off the expansion card.

In Step S512, using the IPMI, the CPU 111 reports to the BMC 141 that the processing of stopping the server 101 has been started.

In Step S513, when the RAID card state determination unit 145 receives, from the CPU ill, the report that the processing of stopping the server 101 has been started, the RAID card state determination unit 145 stops the processing of monitoring the HDD 191-j.

In Step S514, the CPU 111 stops the server 101.

Figure 4:
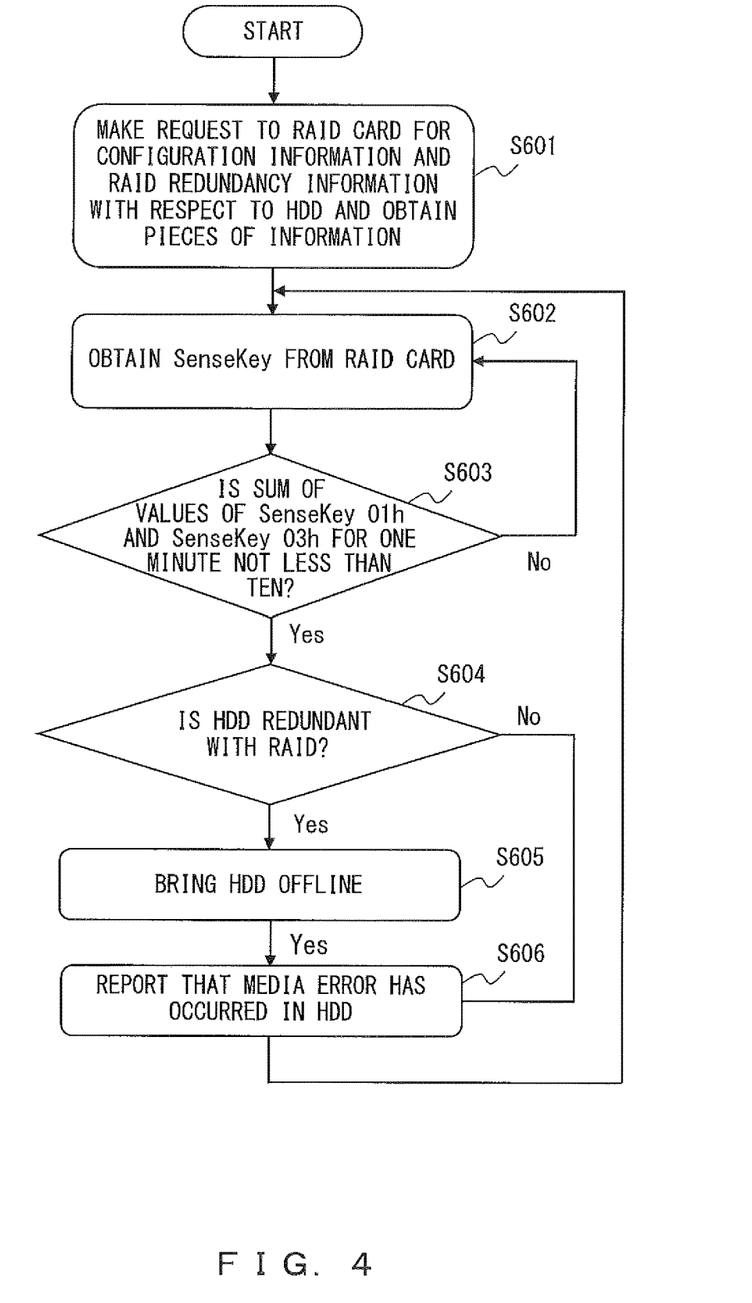
FIG. 4 is a flowchart of monitoring processing performed in a BMC according to the embodiments.

FIG. 4 is a flowchart of the monitoring processing performed in the BMC according to the embodiments.

The flowchart of FIG. 4 is a flowchart of the monitoring processing started in Step S509 of FIG. 3.

As described above, when there exists an expansion card that is a RAID card and the RAID card state determination unit 145 receives the report that the OS has been activated, the monitoring processing is started.

In Step 3601, the media error monitoring unit 142 makes a request to the RAID card 181 for information on the HDD 191-*j* connected to the RAID card 181. The RAID card 181 transmits, as information on the HDD 191-1, configuration information (such as the number of HDDs 191-*j*, a device number of the HDD 191-*j*, and information on which of the connectors of the RAID card 181 the HDD 191-*j* is connected to) and redundancy information (that indicates the redundancy of the HDD 191-*j* and which HDD 191-*j* is redundant) with respect to the HDD 191-*j*. The media error monitoring unit 142 receives the information on the HDD 191-*j* from the RAID card 181. The media error monitoring unit 142 knows a HDD 191-*j* to be monitored by obtaining the information on the HDD 191-*j* which is connected to the RAID card 181, so as to monitor the HDD 191-*j* based on the obtained information.

In Step S602, the media error monitoring unit 142 makes a request to the RAID card 181 for the device number and a SenseKey of the HDD 191-*j*. The media error monitoring unit 142 receives a set of the device number and the SenseKey of the HDD 191-*j* from the RAID card 181 and stores them in the memory 146. When a specified time period (for example, one second) has elapsed since the last request was made, the media error monitoring unit 142 makes a request for a device number and a SenseKey of the HDD 191-*j*. In other words, the media error monitoring unit 142 obtains a device number and a SenseKey of the HDD 191-*j* at specified time intervals.

In Step S603, the media error determination unit 143 checks, for each HDD 191-*j*, whether the sum of values of SenseKey=01h and SenseKey=03h for a specified time period (for example, one minute from one minute ago up to now) is not less than a threshold (for example, ten). When the sum of the values of SenseKey=01h and SenseKey=03h for the specified time period is not less than the threshold with respect to a certain HDD 191-*j*, the media error determination unit 143 determines that the certain HDD 191-*j* is to be replaced due to many media errors (an error HDD). With respect to the SenseKey, SenseKey=01h when it is possible to recover from a media error, and SenseKey=03h when it is not possible to recover from the media error.

In Step S604, the media error determination unit 143 determines whether the error HDD is redundant based on the redundancy information. For example, when the error HDD is a HDD that is mirrored by RAID 1, the error HDD is determined to be redundant.

In Step S605, the media error determination unit 143 transmits, to the RAID card 181, an instruction to bring the error HDD offline. The instruction includes a device number of the error HDD and a request to bring the error HDD offline. When the RAID card 181 receives the instruction, the RAID card 181 brings offline the HDD 191-*j* which corresponds to the device number included in the instruction.

In Step S606, the media error determination unit 143 outputs an error to a system event log so as to report the error of the HDD 191-*j* that has been brought offline to the user using a simple network management protocol (SNMP).

Figure 5:
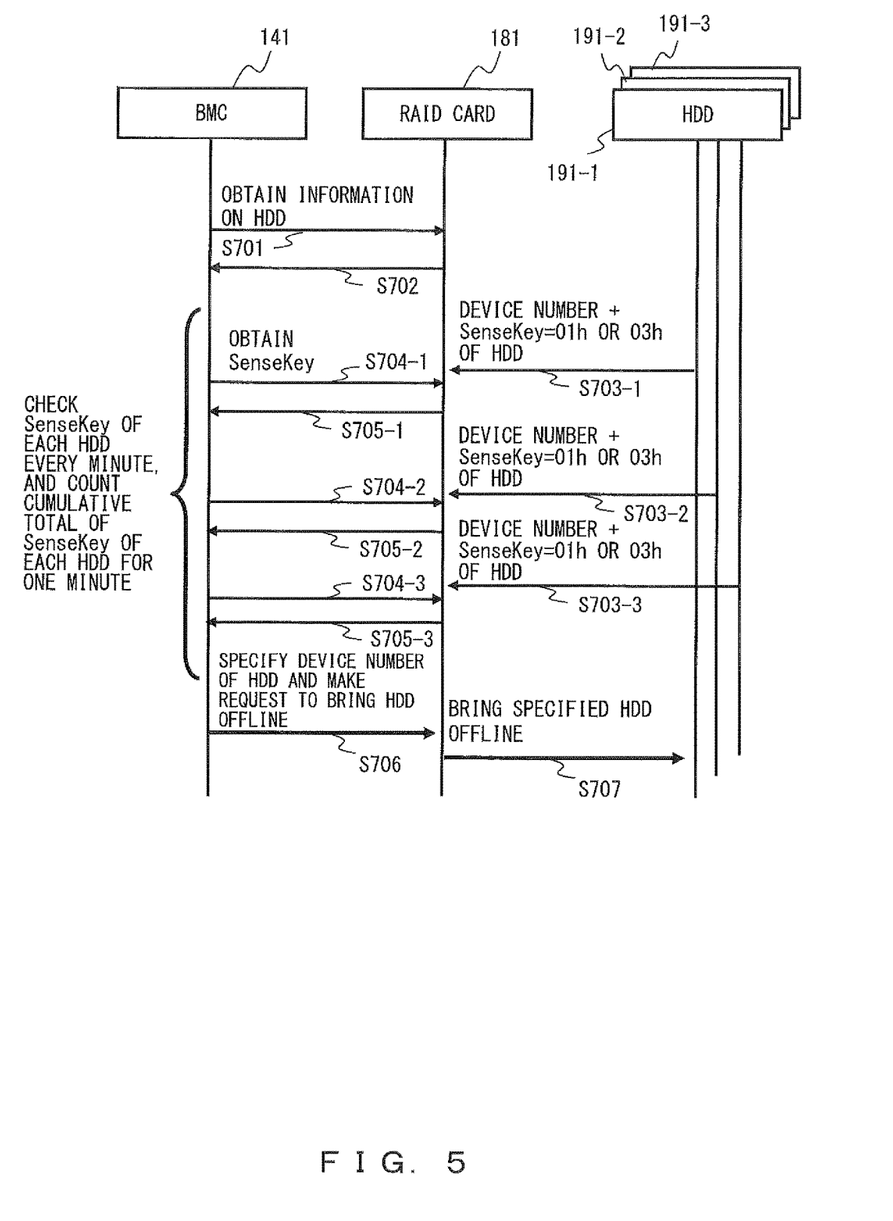
FIG. 5 is a sequence diagram of monitoring processing performed in the server according to the embodiments.

FIG. 5 is a sequence diagram of monitoring processing performed in the server according to the embodiments.

The media error monitoring unit 142 makes a request to the RAID card 181 for information on the HDD 191-1 connected to the RAID card 181 (Step S701).

The RAID card 181 transmits, as the information on the HDD 191-1, configuration information (such as the number of HDDs 191-*j*, a device number of the HDD 191-*j*, and information on which of the connectors of the RAID card 181 the HDD 191-*j* is connected to) and redundancy information (that indicates the redundancy of the HDD 191-*j* and which HDD 191-*j* is redundant) with respect to the HDD 191-*j* (Step S702). The media error monitoring unit 142 receives information on the HDD 191-*j* from the RAID card 181.

When a media error has occurred, the HDD 191-*j* transmits a device number and a SenseKey of the HDD 191-*j* to the RAID card 181 (Step S703-*j*). With respect to the SenseKey, SenseKey=01h when it is possible to recover from a media error, and SenseKey=03h when it is not possible to recover from the media error. The RAID card 181 stores a set of the received device number and the received SenseKey in a register included in the RAID card 181.

The media error monitoring unit 142 makes a request to the RAID card 181 for a device number and a SenseKey of the HDD 191-*j* (Step S704-*j*). The request for the device number and the SenseKey of the HDD 191-*j* is made at specified time intervals (for example, one second).

When the RAID card 181 receives the request, the RAID card 181 transmits the set of the device number and the SenseKey stored in the register to the BMC 141 (Step S705-*j*). After the transmission, the RAID card 181 deletes the set of the device number and the SenseKey in the register. The media error monitoring unit 142 receives the set of the device number and the SenseKey of the HDD 191-*j* from the RAID card 181 and stores them. The media error determination unit 143 checks the sum of values of SenseKey=01h and SenseKey=03h for each HDD 191-*j* for a specified time period (for example, one minute). When the sum of the values of SenseKey=01h and SenseKey=03h for the specified time period is not less than a threshold with respect to a certain HDD 191-*j*, the media error determination unit 143 determines that the certain HDD 191-*j* is to be replaced due to many media errors (an error HDD).

Then, the media error determination unit 143 transmits an offline request including a device number of the error HDD (that is an instruction to bring the error HDD offline) to the RAID card 181 (Step S706).

When the RAID card receives the offline request, the RAID card brings off line the HDD 191-*j* which corresponds to the device number included in the offline request (Step S707).

In the embodiments, the monitoring processing is performed when the expansion card is a RAID card, but the monitoring processing may also be performed when the expansion card is an interface card that does not have a RAID function and to which a HDD can be connected.

According to the information processing device of the embodiments, it is possible to monitor an HDD independently of the type of an OS or a specific RAID card because a BMC monitors the HDD.

According to the information processing device of the embodiments, there is no need to develop software that monitors a HDD for each OS, which results in reducing costs.

According to the information processing device of the embodiments, a BMC monitors a HDD, so resources of an OS will not be consumed, which results in better ensuring the monitoring of a media error in the HDD and the removal of the HDD.

All examples and conditional language provided herein are intended for pedagogical purposes to aiding the reader in understanding the invention and the concepts contributed by the inventor to further the art, and are not to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
    a processor configured to execute an operating system; and
    a baseboard management controller configured to monitor operations of components of the information processing device including the processor, wherein
    the processor collects information on an expansion device connected to the information processing device, and
    the baseboard management controller receives the information on the expansion device from the processor, determines, with respect to a type of an expansion device, whether the expansion device is a specific device that is connected to a storage, and, when the expansion device has been determined to be the specific device, performs, instead of the processor which executes the operating system, monitoring processing of monitoring an operation of the storage connected to the specific device based on information on the storage that is obtained from the specific device.

2. The information processing device according to claim 1, wherein
    the processor collects the information on the expansion device when the information processing device is started, and transmits the information on the expansion device to the baseboard management controller, and
    when the baseboard management controller receives, from the processor, a report that execution of the operating system has been started after the specific device was initialized and the execution of the operating system was started, the baseboard management controller inquires of the specific device about the information on the storage, and starts the monitoring processing based on the information on the storage.

3. The information processing device according to claim 1, wherein the baseboard management controller obtains information indicating the operation of the storage from the specific device at specified time intervals.

4. The information processing device according to claim 3, wherein the processor determines whether the sum of pieces of information on a state of the storage that is being monitored is greater than a threshold, determines that the storage is to be replaced when the sum is greater than the threshold, and makes an offline request to the specific device when the storage is redundant, the pieces of information on a state of the storage being obtained from the specific device.

5. The information processing device according to claim 1, wherein
    the information on the expansion device includes type information that identifies the expansion device, and
    the baseboard management controller determines the type of the expansion device using the type information.

* * * * *